Jan. 14, 1964 T. H. MARTLAND 3,117,533
CONVERTIBLE CLASSROOM FURNITURE
Filed March 10, 1961
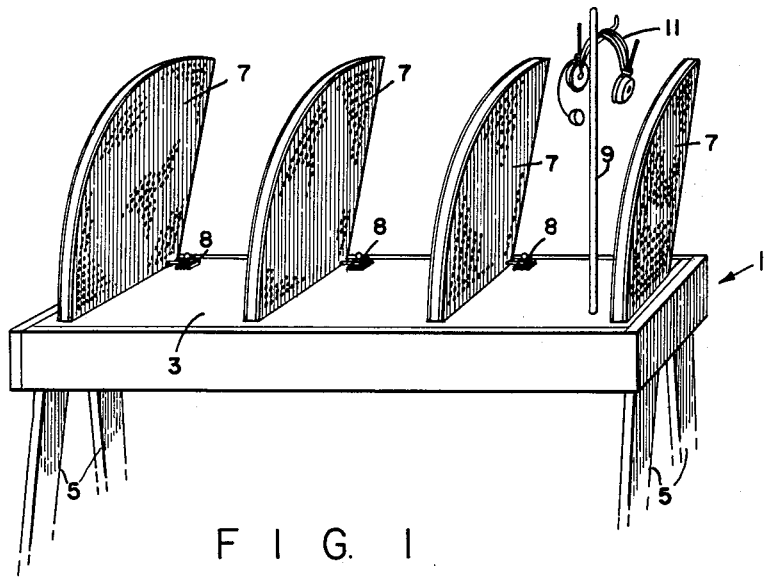
FIG. 1
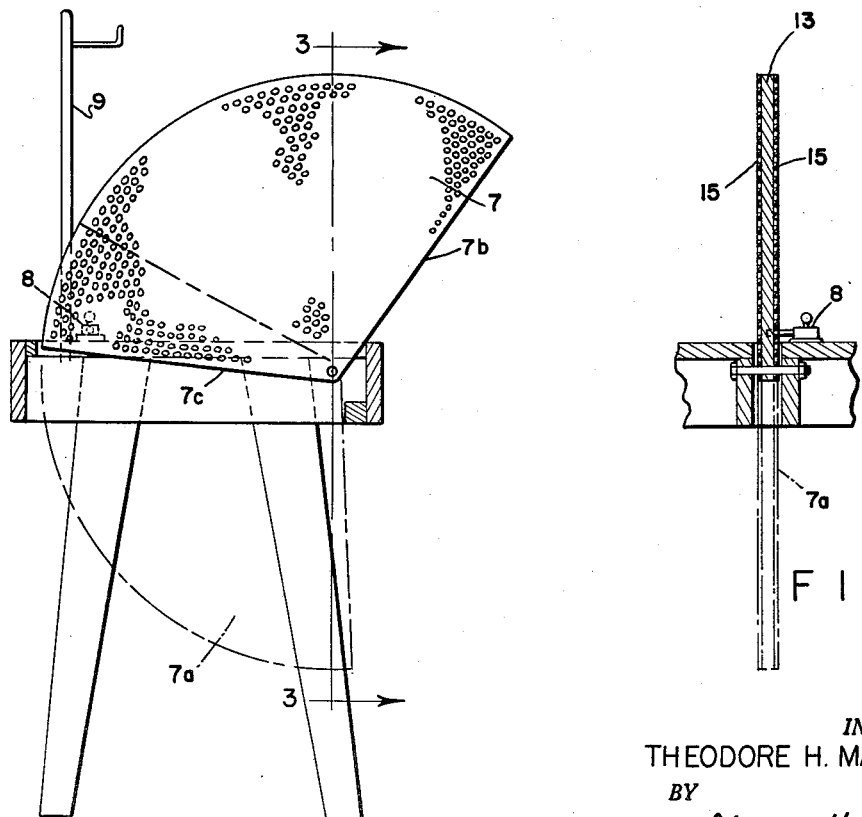
FIG. 2
FIG. 3
INVENTOR.
THEODORE H. MARTLAND
BY
Stanley H. Mervis
ATTORNEY

United States Patent Office 3,117,533
Patented Jan. 14, 1964

3,117,533
CONVERTIBLE CLASSROOM FURNITURE
Theodore H. Martland, Dobbs Ferry, N.Y. (% Central High School District No. 1, 85 W. Hawthorne Ave., Valley Stream, N.Y.)
Filed Mar. 10, 1961, Ser. No. 94,883
2 Claims. (Cl. 108—60)

This invention relates to furniture for use in language teaching, and, more particularly, with student stations readily and simply convertible for normal classroom use.

A primary object of this invention is to provide classroom furniture readily and easily convertible to and from use (1) as a classroom table or desk and (2) as a language lab or teaching lab station. Other objects of the invention will in part be obvious and will in part appear hereinafter.

The invention accordingly comprises the product or article of manufacture possessing the features, properties and the relation of components which are exemplified in the following detailed disclosure, and the scope of the application of which will be indicated in the claims.

A major change in the teaching of languages, particularly foreign languages, has occurred in recent years. The customary oral lecture and demonstration by the instructor, and the oral recitation by the student before the whole class, has given way to the use of electronic classrooms, and this technique of teaching is likely to be extended to the teaching of subjects other than languages, e.g., shorthand dictation practice, speech, etc. Such an electronic classroom is equipped with earphones and microphones for a large number of students, and a master control panel including at least one tape recorder.

If, for example, the master control panel has a phonograph and two tape recorders, the instructor may have one, two or three lessons playing to a corresponding number of groups at one time, and may listen to or record any student to test or determine his progress. A lesson may be prerecorded with suitable pauses to permit the listening student to repeat a phrase or to answer using his own individual microphone, and his reply may be recorded. The student may play back the lesson and listen to it and his answer, in his own individual earphones, thereby permitting him to compare his pronunciation with that of the teacher or of another person skilled in the particular language. The time of each student is thus utilized more effectively, as he does not have to await his turn to recite nor is he misled by the errors of his classmates.

Language training classrooms have customarily used long tables accommodating a number of students, but divided into individual stations or booths, each student being "insulated" from his neighbors by fixed, stationary acoustic partitions. While this equipment has been effective, the classroom is useful only for this specific type of instruction. This inflexibility in the utility of the classroom is a decided disadvantage, and becomes an economic hardship for schools having an enrollment too small to make full time use for language instruction. It is most desirable that the classroom be useful for other types of instructional activities, e.g., films, discussions, examinations, etc.

This invention provides furniture which may be readily and simply converted to and from use in language instruction or normal classroom uses. In accordance with this invention, a student table accommodating a plurality of students is provided with a plurality of vertical, rotatable acoustical panels which, in a first or up position divide the table into a plurality of pupil stations acoustically insulated from each other, and in a second or down position, provide a student table or desk suitable for normal classroom use.

For a fuller understanding of the nature and objects of this invention, reference should be had to the following detailed description taken in connection with the accompanying drawing wherein:

FIGURE 1 is a perspective view of one embodiment of this invention;

FIG. 2 is an end view of an embodiment similar to that shown in FIGURE 1; and

FIG. 3 is a sectional view taken along the line 3—3 in FIG. 2.

As shown in FIGURE 1, the language instruction table 1 includes an elongated, preferably horizontal top or work surface 3 appropriately supported, e.g., by legs 5 so positioned as not to interfere with the free rotation of the plurality of rotatable acoustical dividers 7 which in their raised position divide the table 1 into a plurality of pupil stations, e.g., six pupil stations. Each pupil station is preferably provided with a suitable microphone and earphone headset 11, which may be hung from a suitable hanger 9 (only one such headset and hanger being shown) and appropriately wired to connect with the instruction equipment. If desired, a drawer, shelf or other supply storage facilities may be positioned under the work surface, as long as the rotation of the acoustical divider is unaffected.

In a preferred embodiment, the acoustical divider 7 comprises a 90 to 120° arc of a circle, and more preferably a 120° arc, e.g., 19" in radius, and the leading edge 7b extends past the inward edge of the table surface 3, as shown in FIG. 2. This embodiment extends the acoustical "booth" to include the student's head without requiring the student to lean forward in an awkward or uncomfortable position.

As shown in FIGS. 2 and 3, the acoustical divider 7 is rotatably mounted, e.g., by means of a pin 17, or by suitable hinging means, and may be readily rotated into a downward position 7a, thereby permitting the table 1 to be used for normal classroom purposes. When the acoustical divider 7 comprises an arc of about 120° and is rotated downward, the leading edge of the acoustical divider 7 extends above the table surface forming an angle of about 20° to 30°, with the trailing edge 7c positioned within the vertical line formed by the inward edge of the table with the floor so that it does not extend into the chair area of the student. The upward and/or downward rotation of the acoustical divider 7 may be controlled by any desired stop means, e.g., a short extension of either or both edges of the divider, a simple bar type member inserted at an appropriate point near either edge of the divider 7, a spring catch, etc. Where desired, one may employ suitable retaining means to hold the acoustical divider 7 in its upward position, e.g., a simple spring catch 8 readily operable by the student. Such retaining means preferably would be positioned within convenient reach of the student, so as to relieve the instructor of setting up the equipment. The acoustical divider 7 is preferably composed of a sandwich of acoustical material 13 between two sheets of pegboard 15. It will be understood, of course, that the composition of the acoustical divider may be selected from among many well known acoustical materials.

It will be noted that acoustical panels are provided on each side of the student only, and not in front of him. Omission of the acoustical barrier at the front of each station is facilitated by the use of earphone-microphone headsets. This structure permits the instructor and the student to see each other, and also facilitates use of the table for normal classroom purposes when the acoustical divider is rotated downward into its inoperative position. The student is enabled to observe the entire room, including chalkboards on the side walls. The microphone and earphone headsets are out of the way, but remain in sight of the instructor. This effectively discourages the student from tampering with this expensive equipment.

Since certain changes may be made in the above product and article without departing from the scope of the invention herein involved, it is intended that all matter contained in the above description or shown in the accompanying drawing shall be interpreted as illustrative and not in a limiting sense.

What is claimed is:

1. An article of classroom furniture comprising a work surface having a long dimension, a plurality of vertical acoustical panels comprising an arc of about 120° each and positioned within openings in said work surface located transverse of said long dimension, each of said vertical acoustical panels being pivotably mounted at one corner thereof to be rotatable about said pivot and within said transverse opening, said vertical acoustical panels, when rotated into an upward position, dividing said long dimension of said work surface into a plurality of pupil stations, and stop means on said vertical acoustical panels whereby, when rotated downward, a portion of each of said vertical acoustical panels comprising an arc of about 20° to 30° extends above said work surface.

2. A language laboratory student station comprising a supported work surface having a long dimension and transverse elongated openings, vertical acoustical panels each of which comprises a flat 90 to 120° radial segment of a circle, said vertical acoustical panels being rotatably mounted at the apexes thereof within said transverse elongated openings by means of pivots at the front portions of said elongated openings towards the sitting side of said supported work surface, stop means to limit the downward rotation of said vertical acoustical panels and thereby maintain a portion thereof projecting above said work surface, and means for retaining said vertical acoustical panels in a raised position to define a pupil station therebetween.

References Cited in the file of this patent
UNITED STATES PATENTS

| | | |
|---|---|---|
| 134,496 | Vetter | Dec. 31, 1872 |
| 877,104 | Meier | Jan. 21, 1908 |
| 1,463,289 | Mitchell | July 31, 1923 |
| 1,903,026 | Buckley | Mar. 28, 1933 |
| 1,992,903 | Potashnik | Feb. 26, 1935 |
| 2,944,861 | Lessin | July 12, 1960 |
| 2,961,280 | Jentzen | Nov. 22, 1960 |
| 2,970,874 | Honeycutt | Feb. 7, 1961 |

OTHER REFERENCES

Electronic Language Teaching System Starts at G.U., written matter and pictures published by Washington Post Newspapers, November 22, 1950.